(12) United States Patent
Shin et al.

(10) Patent No.: US 11,037,362 B2
(45) Date of Patent: Jun. 15, 2021

(54) METHOD AND APPARATUS FOR GENERATING 3D VIRTUAL VIEWPOINT IMAGE

(71) Applicant: Electronics and Telecommunications Research Institute, Daejeon (KR)

(72) Inventors: Hong-Chang Shin, Daejeon (KR); Gwang Soon Lee, Daejeon (KR); Jun Young Jeong, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/913,568

(22) Filed: Jun. 26, 2020

(65) Prior Publication Data

US 2020/0410746 A1 Dec. 31, 2020

(30) Foreign Application Priority Data

Jun. 27, 2019 (KR) .................. 10-2019-0077089

(51) Int. Cl.
| | | |
|---|---|---|
| *G06F 3/01* | (2006.01) | |
| *G06T 15/10* | (2011.01) | |
| *G06T 3/00* | (2006.01) | |
| *G06T 7/194* | (2017.01) | |

(52) U.S. Cl.
CPC .............. *G06T 15/10* (2013.01); *G06F 3/013* (2013.01); *G06T 3/0093* (2013.01); *G06T 7/194* (2017.01)

(58) Field of Classification Search
CPC ............................... G06T 3/0093; G06T 15/10
See application file for complete search history.

(56) References Cited

U.S. PATENT DOCUMENTS

| | | | | |
|---|---|---|---|---|
| 2012/0086775 | A1* | 4/2012 | Bae ...................... | H04N 13/261 348/46 |
| 2013/0002818 | A1* | 1/2013 | Choi ....................... | G06T 5/005 348/43 |
| 2013/0135298 | A1* | 5/2013 | Isogai ..................... | G06T 15/04 345/419 |
| 2013/0155502 | A1 | 6/2013 | Kwak et al. | |
| 2013/0162637 | A1 | 6/2013 | Son | |
| 2014/0098100 | A1* | 4/2014 | Dane .................... | H04N 13/302 345/427 |

(Continued)

FOREIGN PATENT DOCUMENTS

| | | |
|---|---|---|
| KR | 10-1411568 B1 | 6/2014 |
| KR | 10-2019-0001896 A | 1/2019 |

OTHER PUBLICATIONS

Champel et al., "International Organisation for Standardisation Organisation Internationale de Normalisation ISO/IEC JTC1/SC29/WG11 Code of Moving Pictures and Audio," ISO/IEC JTC1/SC29/WG11 MPEG 116/m39282, Oct. 2016, ChengDu, China, 7 pages in English.

(Continued)

*Primary Examiner* — Phi Hoang

(74) *Attorney, Agent, or Firm* — NSIP Law

(57) ABSTRACT

A method and an apparatus for generating a three-dimension (3D) virtual viewpoint image including: segmenting a first image into a plurality of images indicating different layers based on depth information of the first image at a gaze point of a user; and inpainting an area occluded by foreground in the plurality of images based on depth information of a reference viewpoint image are provided.

6 Claims, 12 Drawing Sheets

(56) References Cited

U.S. PATENT DOCUMENTS

| | | | | |
|---|---|---|---|---|
| 2014/0333739 | A1* | 11/2014 | Yang | H04N 13/128 |
| | | | | 348/54 |
| 2018/0060700 | A1* | 3/2018 | Bleyer | H04N 5/2256 |
| 2018/0182178 | A1* | 6/2018 | Varanasi | G06T 15/205 |
| 2020/0394770 | A1* | 12/2020 | Roulet | G06T 5/005 |

OTHER PUBLICATIONS

Shin et al., "Object-centered View Synthesis using Learning-based Image Inpainting," 2019 ITE and SID, Feb. 13-15, 2019, pp. 154-156 (3 pages in English, 4 pages in Korean).

* cited by examiner

METHOD AND APPARATUS FOR GENERATING 3D VIRTUAL VIEWPOINT IMAGE

CROSS-REFERENCE TO RELATED APPLICATION

This application claims priority to and the benefit of Korean Patent Application No. 10-2019-0077089 filed in the Korean Intellectual Property Office on Jun. 27, 2019, the entire contents of which are incorporated herein by reference.

BACKGROUND OF THE INVENTION

(a) Field of the Invention

The present specification relates to a method and an apparatus for generating a three-dimensional (3D) virtual viewpoint image.

(b) Description of the Related Art

A 3D image is generated from a virtual viewpoint, and may provide a binocular parallax and motion parallax by using a single or multiple images obtained from different viewpoints for the same scene. In order to generate a viewpoint image at a virtual location, depth information which includes 3D distance information may be used.

The accuracy of the depth information corresponding to a reference viewpoint image and information about a 3D geometric relationship between the reference viewpoint and the virtual viewpoint affects quality of the virtual viewpoint image generated at the virtual location. It is technically difficult to accurately estimate the depth information.

Since there must be consistency between each of the depth images when there are two or more reference viewpoint images, it is complicated to generate the 3D viewpoint image by using the depth information for all pixels in a scene.

The above information disclosed in this Background section is only for enhancement of understanding of the background of the invention, and therefore it may contain information that does not form the prior art that is already known in this country to a person of ordinary skill in the art.

SUMMARY OF THE INVENTION

An exemplary embodiment of the present specification provides a method for generating a three-dimensional (3D) virtual viewpoint image. Another exemplary embodiment of the present specification provides an apparatus for generating a 3D virtual viewpoint image. Yet another exemplary embodiment of the present specification provides another apparatus for generating a 3D virtual viewpoint image.

According to the exemplary embodiment of the present specification, a method for generating a three-dimension (3D) virtual viewpoint image is provided. The method includes: segmenting a first image into a plurality of images indicating different layers based on depth information of the first image at a gaze point of a user; and inpainting an area occluded by foreground in the plurality of images based on depth information of a reference viewpoint image.

The method may further include providing a parallax to a second image in which the plurality of images are sequentially arranged based on depth of a gaze direction of the user.

The providing a parallax to a second image in which the plurality of images are sequentially arranged based on depth of a gaze direction of the user may include: determining a third image generated when a central axis of the user in the second image is moved in at least one direction of up, down, left, right, forward, and backward; and performing image warping on the third image.

The performing image warping on the third image may include: separating a background area and a foreground area from the third image; and performing the image warping on the background area and the foreground area.

The performing image warping on the background area and the foreground area may include performing the image warping in an order from the farthest foreground area to the closest foreground area among the foreground areas.

According to another exemplary embodiment of the present specification, an apparatus for generating a three-dimension (3D) virtual viewpoint image is provided. The apparatus includes: an image information generator configured to segment a first image into a plurality of images indicating different layers based on depth information of the first image at a gaze point of a user; and an image generator configured to inpaint an area occluded by foreground in the plurality of images based on depth information of a reference viewpoint image.

The apparatus may further include a parallax generator configured to provide a parallax to a second image in which the plurality of images are sequentially arranged based on depth of a gaze direction of the user.

The parallax generator may be further configured to: determine a third image generated when a central axis of the user in the second image is moved in at least one direction of up, down, left, right, forward, and backward; and perform image warping on the third image.

When the parallax generator performs the image warping on the third image, the parallax generator may be further configured to: separate a background area and a foreground area from the third image; and perform image warping on the background area and the foreground area.

When the parallax generator performs the image warping on the background area and the foreground area, the parallax generator may be further configured to perform the image warping in an order from the farthest foreground area from the user to the closest foreground area among the foreground areas.

According to yet another exemplary embodiment of the present specification, an apparatus for generating a three-dimensional (3D) virtual viewpoint image is provided. The apparatus includes: a processor and a memory, wherein the processor executes a program stored in the memory to perform: segmenting a first image into a plurality of images representing different layers based on depth information of the first image at a gaze point of a user; and reconstructing an area occluded by foreground in the plurality of images based on depth information of a reference viewpoint image.

After the reconstructing an area occluded by foreground in the plurality of images based on depth information of a reference viewpoint image, the processor may further perform providing a parallax to a second image in which the plurality of images are sequentially arranged based on depth of a gaze direction of the user.

When the processor performs the providing a parallax to a second image in which the plurality of images are sequentially arranged based on depth of a gaze direction of the user, the processor may perform: determining a third image generated when a central axis of the user in the second image is moved in at least one direction of up, down, left, right, forward, and backward; and performing image warping on the third image.

When the processor performs performing image warping on the third image, the processor may perform: separating a background area and a foreground area from the third image; and performing the image warping on the background area and the foreground area.

When the processor performs performing the image warping on the background area and the foreground area, the processor may perform performing the image warping in an order from the farthest foreground area from the user to the closest foreground area among the foreground areas.

DETAILED DESCRIPTION OF THE EMBODIMENTS

Figure 1:
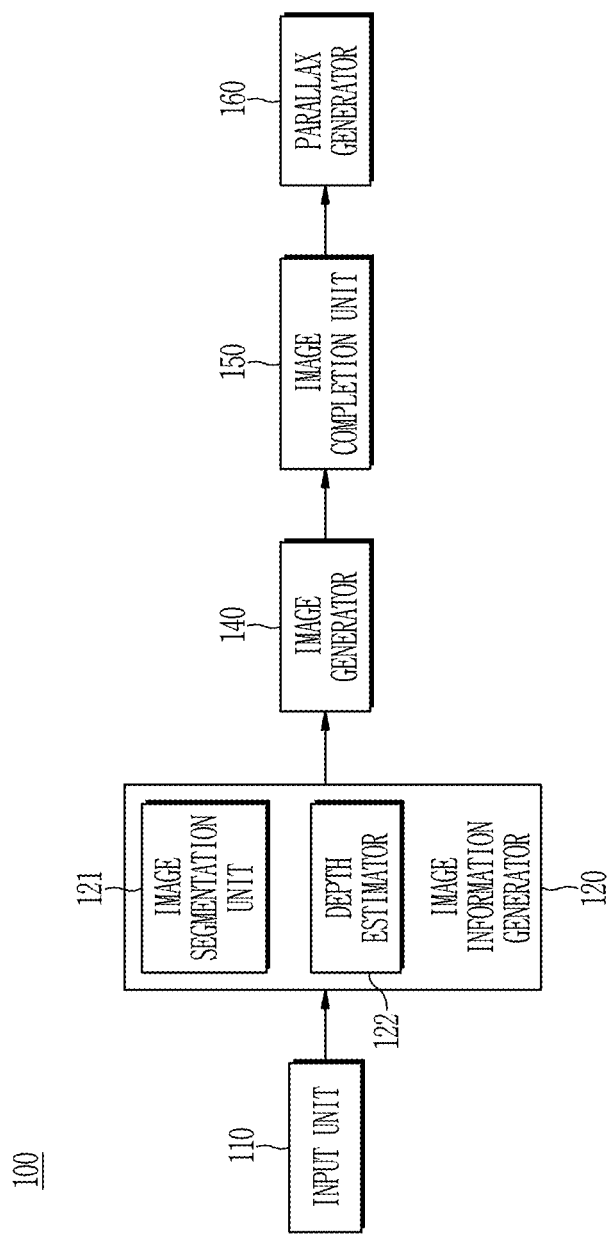
FIG. 1 is a block diagram illustrating an apparatus for generating a 3D virtual view image according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive, and like reference numerals designate like elements throughout the specification. In this specification, redundant description of the same constituent elements is omitted.

Also, in this specification, it is to be understood that when one component is referred to as being "connected" or "coupled" to another component, it may be connected or coupled directly to the other component or may be connected or coupled to the other component with another component intervening therebetween.

On the other hand, in this specification, it is to be understood that when one component is referred to as being "connected or coupled directly" to another component, it may be connected or coupled to the other component without another component intervening therebetween.

It is also to be understood that the terminology used herein is only used for the purpose of describing particular embodiments, and is not intended to limit the invention. Singular forms are to include plural forms unless the context clearly indicates otherwise. It will be further understood that terms "comprises" and "have" used in the present specification specify the presence of stated features, numerals, steps, operations, components, parts, or a combination thereof, but do not preclude the presence or addition of one or more other features, numerals, steps, operations, components, parts, or a combination thereof.

Also, as used herein, the term "and/or" includes any plurality of combinations of items or any of a plurality of listed items. In the present specification, "A or B" may include "A", "B", or "A and B".

Figure 2:
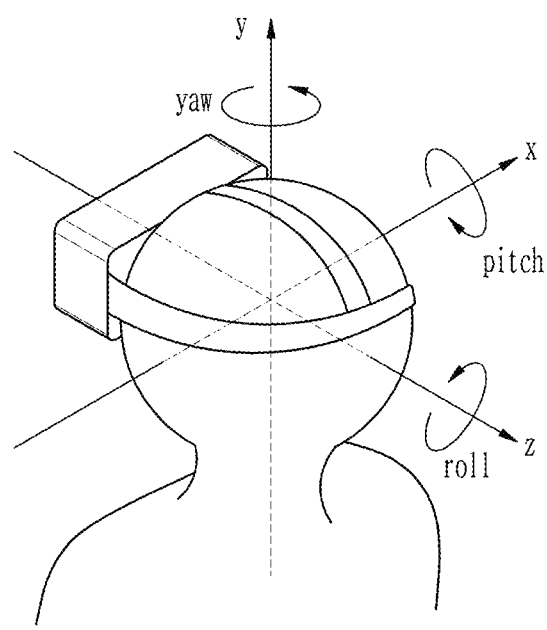
FIG. 2 is a schematic diagram describing motion information of a user according to an exemplary embodiment.
Figure 3:
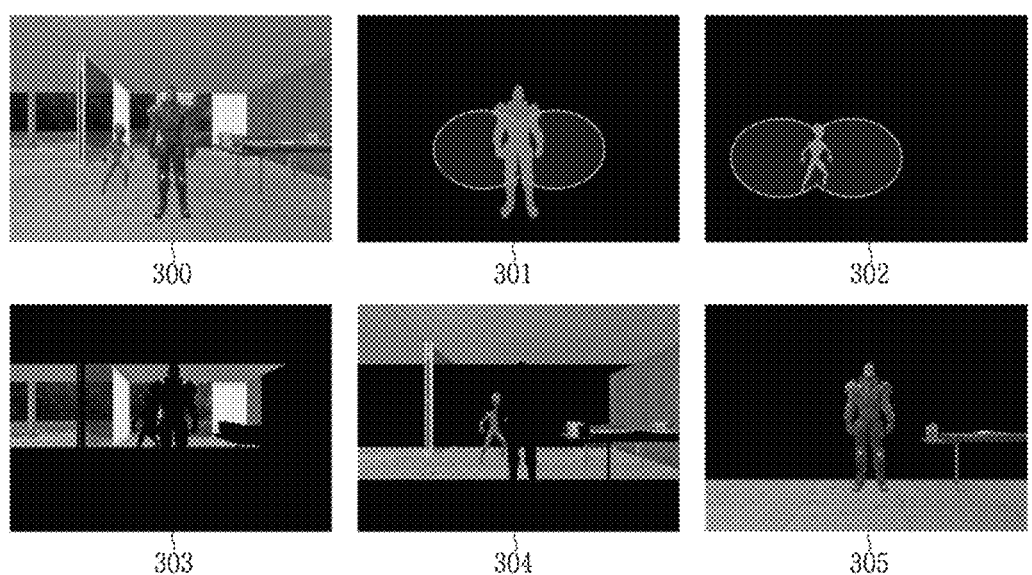
FIG. 3 is a schematic diagram describing image segmentation according to an exemplary embodiment.
Figure 4:
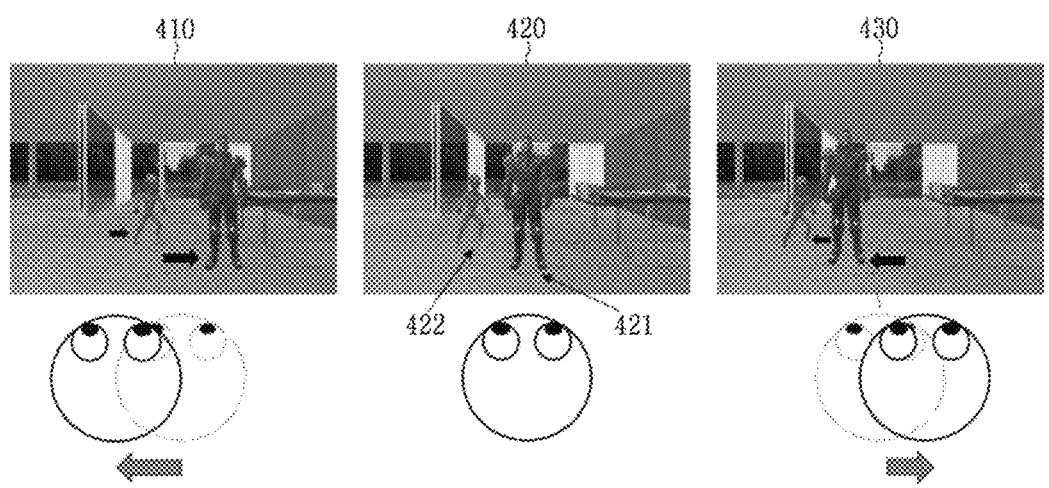
FIG. 4 is a schematic diagram showing a scene change according to movement of a central axis of the user according to an exemplary embodiment.
Figure 5:
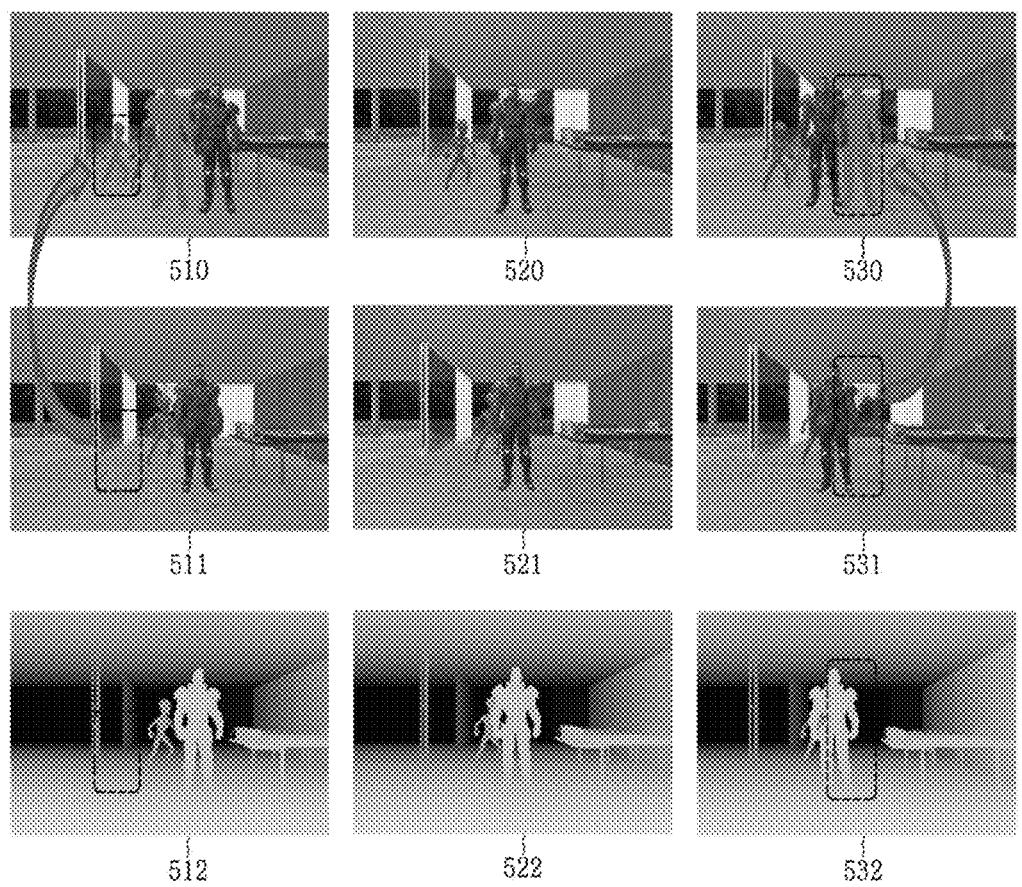
FIG. 5 is a schematic diagram illustrating an image generation process when there are three camera viewpoints for a scene according to an exemplary embodiment.
Figure 6:
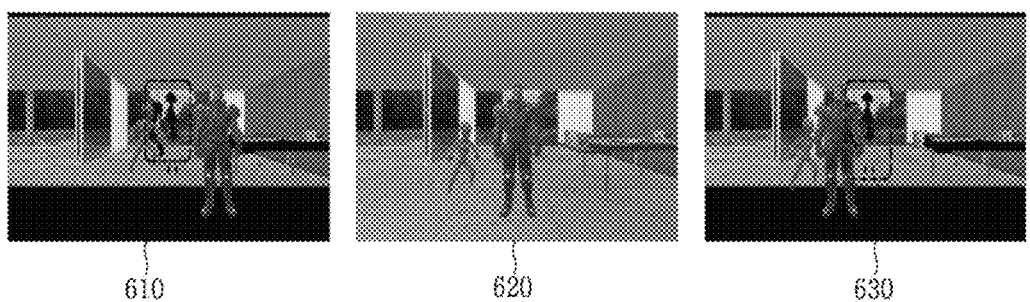
FIG. 6 is a schematic diagram showing an image generation result according to an exemplary embodiment.
Figure 7A:
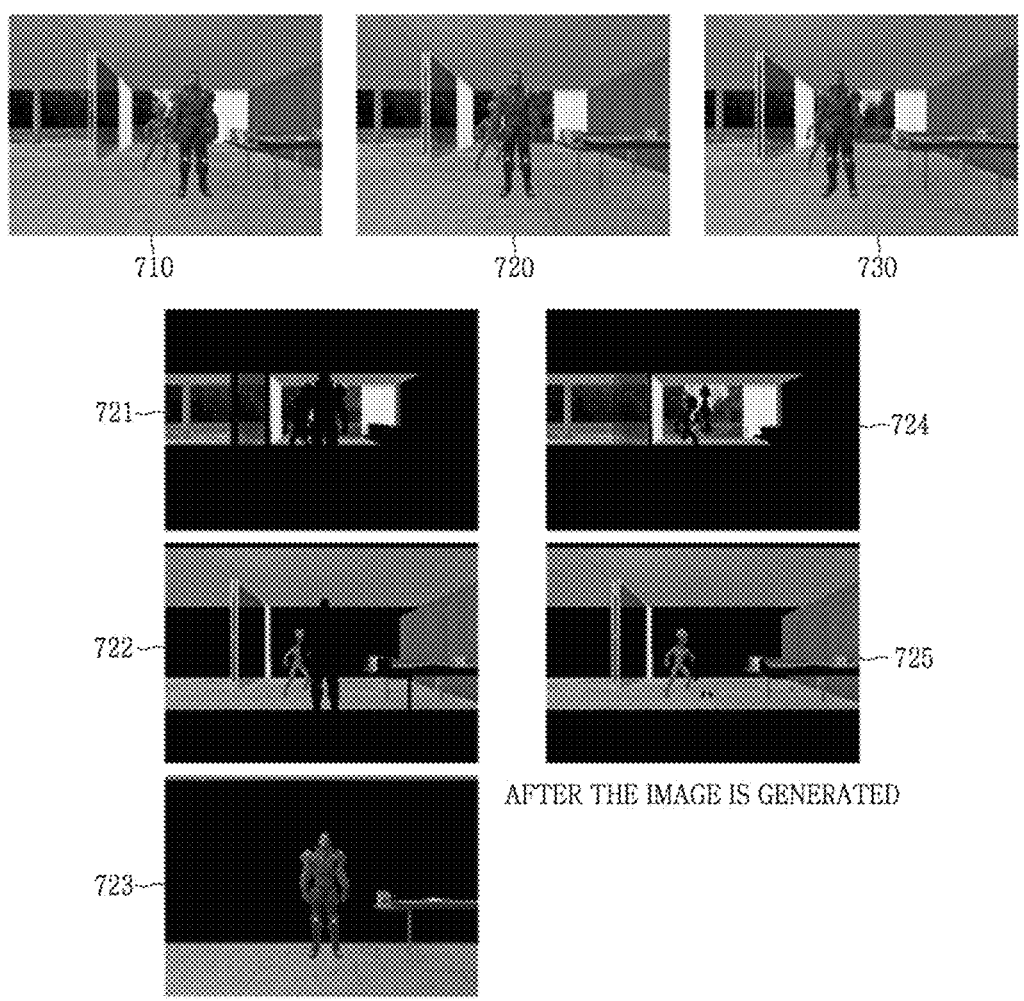
FIG. 7A and FIG. 7B are schematic diagrams illustrating an image generation and completion process for each depth layer according to an exemplary embodiment.
Figure 7B:
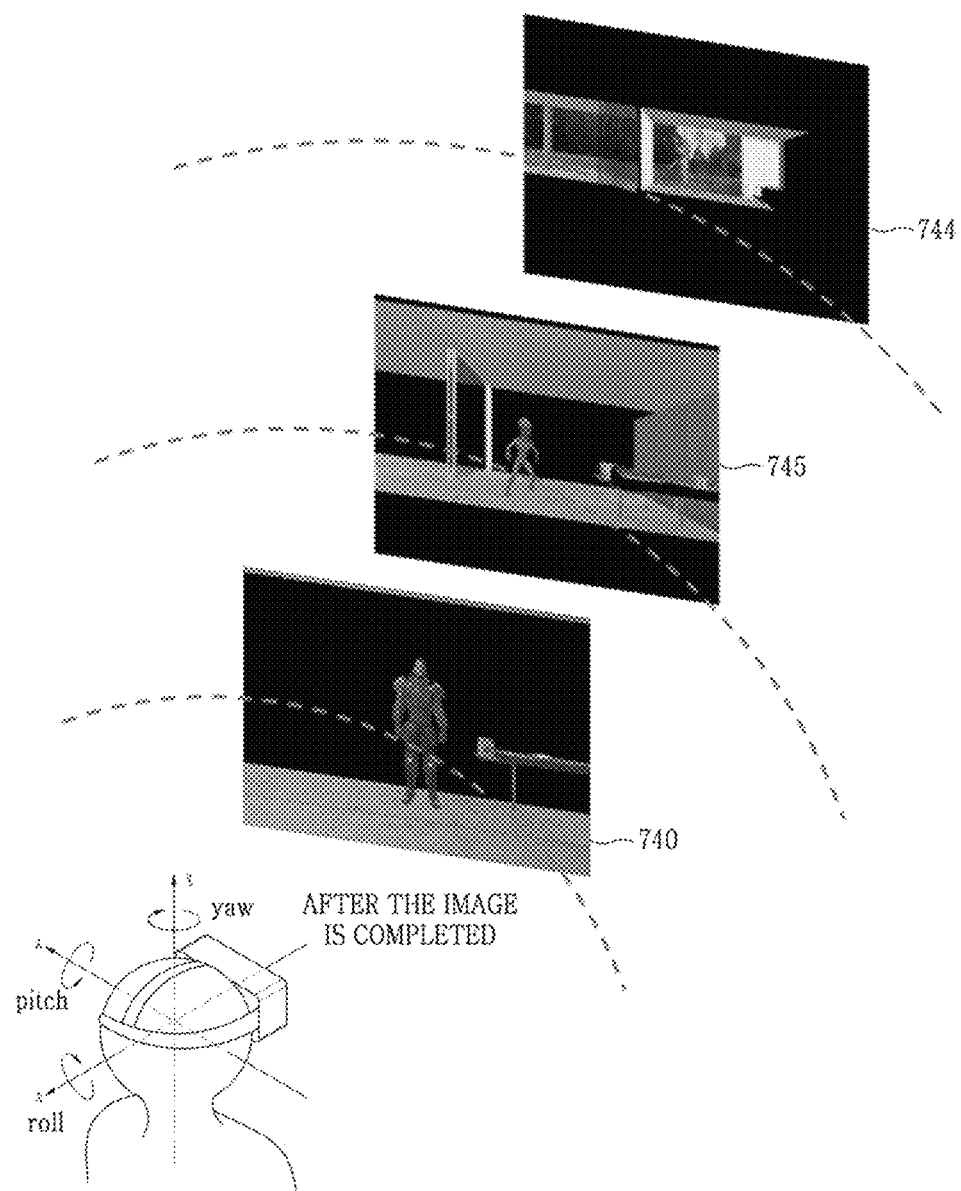
Figure 8:
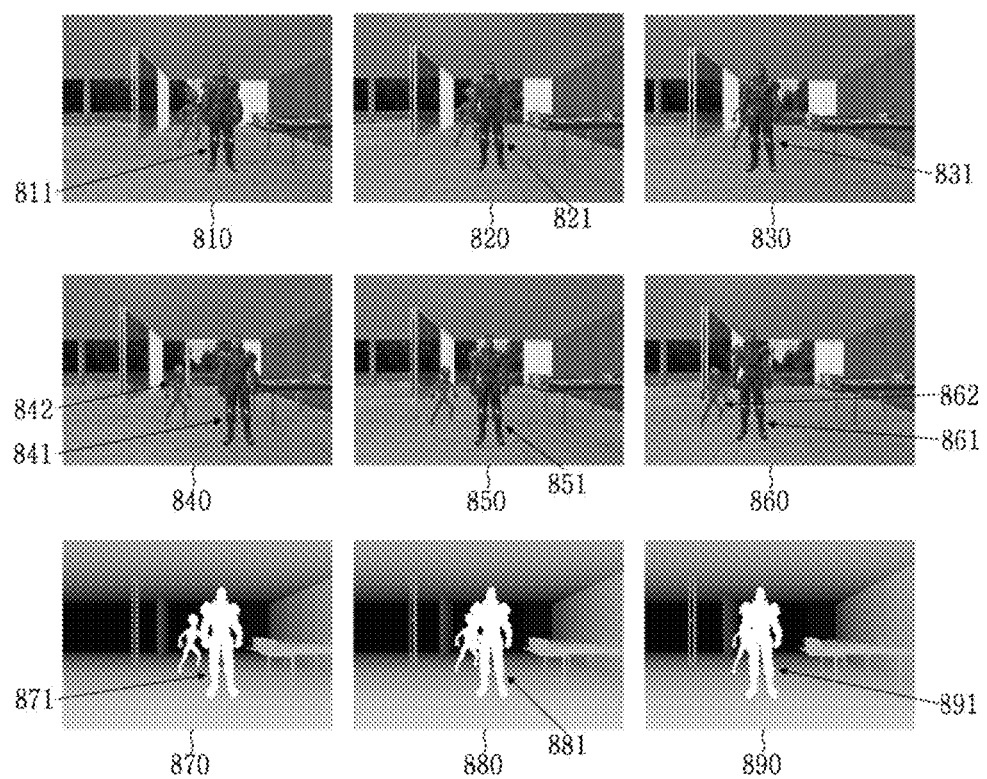
FIG. 8 is a schematic diagram illustrating a parallax generating process according to an exemplary embodiment.

FIG. 1 is a block diagram illustrating an apparatus for generating a 3D virtual view image according to an exemplary embodiment. FIG. 2 is a schematic diagram describing motion information of a user according to an exemplary embodiment. FIG. 3 is a schematic diagram describing image segmentation according to an exemplary embodiment. FIG. 4 is a schematic diagram showing a scene change according to movement of a central axis of the user according to an exemplary embodiment. FIG. 5 is a schematic diagram illustrating an image generation process when there are three camera viewpoints for a scene according to an exemplary embodiment. FIG. 6 is a schematic diagram showing an image generation result according to an exemplary embodiment. FIG. 7A and FIG. 7B are schematic diagrams illustrating an image generation and completion process for each depth layer according to an exemplary embodiment. FIG. 8 is a schematic diagram illustrating a parallax generating process according to an exemplary embodiment.

Referring to FIG. 1, a virtual viewpoint image generating apparatus 100 according to an exemplary embodiment may include an input unit 110, an image information generator 120, an image generator 140, an image completion unit 150, and a parallax generator 160.

The input unit 110 may receive camera images photographed at different locations for a target scene. As an exemplary embodiment, the input unit 110 may receive, from a sensor, motion information of a user gazing at the target scene. The motion information of the user may include degrees of freedom information for the motion of the user such as FIG. 2. The degree of freedom information may include three-way rotation movement information (up/down rotation, left/right rotation, and front/rear rotation) based on a user center and information of movement of the central axis based on the user center (up/down movement, left/right movement, and front/rear movement). The motion information of the user may also include a gaze position of the user. The input unit 110 may transmit multi-reference view images and the motion information of the user to the image information generator 120.

The image information generator 120 may segment an image into a plurality of images indicating different layers based on depth information of the image at a gaze point of the user. The image information generator 120 may include, for example, an image segmentation unit 121 and a depth estimator 122.

An image segmentation process by the image segmentation unit 121 and a depth estimation process by the depth estimator 122 may be performed simultaneously with a process for estimating information commonly required, for example, information on a boundary of an object. In addition, necessary data may be exchanged with each other during the processes.

The image segmentation unit 121 may segment the image based on the multi-reference view images received from the input unit 110 and the motion information of the user. The image segmentation unit 121 may segment objects from a reference viewpoint images by using an image segmentation method. The image segmentation method according to the exemplary embodiment may include at least one of a segmentation method using a computer vision algorithm, a segmentation method based on a pre-generated object segmentation mask image, and a segmentation method based on depth.

Referring to FIG. 3, each of an image 301 and an image 302 may indicate a segmented scene for an object of interest designated by a gaze area when the user views an image 300. When the image is segmented, areas of interest corresponding to a foreground and a background may be separated.

The image segmentation unit 121 may segment the image 300 into three layers including the image 303, the image 304, and the image 305 based on depth information which is distance information from the user. The number of layers may be variously pre-set according to the composition of the target scene and the distribution of depth information.

As shown in FIG. 3, when the foreground and the background are separated, if the foreground moves in an opposite direction to a moving direction of the user, the user may feel a motion parallax, thereby sensing the depth of the front.

Referring to FIG. 4, it may be learned that objects in the foreground moves in the opposite direction according to the movement of the central axis of the user. The image 410 is an image in which the user moves to the left with respect to the image 420, and the image 430 is an image in which the user moves to the right. The object 421 and the object 422 move in opposite directions with respect to the movement direction of the user. Since a distance from the user to the object 421 is closer than a distance from the user to the object 422, the motion parallax is greater for the object 421. In a real natural environment, the background areas other than the object 421 and the object 422 should also appear to move together, but when a pseudo motion parallax effect in which only the object is moved is applied, the user may perceive the depth of the scene. When only a similar motion parallax effect is applied, a cardboard effect may occur as if the 3D paper not having 3D effect moves to the left or right. In addition, after the objects in the segmented foreground moves, an area occluded by the foreground object (occluded area) may appear in the scene. Such a problem may be handled by the depth estimator 122, the image generator 140, the image completion unit 150, and the parallax generator 160.

Referring to FIG. 5, an image 511 may indicate a left reference viewpoint based on an image 521 which is for the center reference viewpoint, and an image 531 may indicate a right reference viewpoint based on the image 521. An image 510 may represent an occluded area generated when the foreground area moves to the right while the user moves the central axis to the left in the image 521 for the center reference viewpoint. An image 530 may represent an occluded area generated when the foreground area moves to the left while the user moves the central axis to the right in the image 521 for the center reference viewpoint.

The occluded are may be inpainted (that is, filled with) by using reference viewpoint information of the reference viewpoint images 511 and 513 generated by a camera located at different viewpoints.

The depth estimator 122 may generate a depth image corresponding to each of the reference viewpoints.

The depth image for a live scene may be calculated through a depth estimation technique (or disparity estimation technique) called stereo matching. The corresponding points for all the pixels between the images captured by the at least two cameras for two or more viewpoints may be found, and the disparity, which is a distance between the corresponding points, may be converted into a depth value of the z-axis through a 3D geometric relationship. Since the depth information obtained through the depth estimation technique is information corresponding to all pixels in the scene, it may have a continuous distribution. When generating the virtual viewpoint through image synthesis, since continuous depth information is used, the generated scene may be reconstructed to approximate the actual geometry.

The image generator 140 may reconstruct an area occluded occluded by the foreground in a plurality of images based on the depth information of the reference viewpoint image. Specifically, the image generator 140 may inpaint the occluded area by using an image warping method in which a geometric relationship between the reference viewpoint images and image 512, the image 522, and the image 532, which are the depth images (or the disparity images) corresponding to each of the image 511, the image 521, and the image 531 is used. After the image generation process by the image generator 140, an image illustrated in FIG. 6 may be generated. The areas marked with dotted lines in the images 610 and 630 may indicate results inpainted through the image warping. Since an invisible unknown area is generated at all reference viewpoints, an area which is not completely inpainted may remain despite the image generation process by the image generator 140. The unknown area may be reconstructed by the image completion unit 150.

When a 3D geometric relationship between the reference viewpoint and the virtual viewpoint and the depth image containing depth information corresponding to the reference viewpoint image are input, a realistic 3D image may be generated through an image synthesis technique using the 3D geometric relationship. In this case, the depth image used for the realistic 3D image may correspond to all pixels or all image areas of the reference viewpoint image. The accuracy of the depth information corresponding to the reference viewpoint image and the information about the 3D geometric relationship between the reference viewpoint and the virtual viewpoint may affect the quality of the virtual viewpoint image generated at the virtual location. The 3D geometric relationship may be obtained by a camera calibration method, and the depth information may be obtained by an active sensor or estimated by the computer vision algorithm such as the stereo matching.

The image completion unit 150 according to an exemplary embodiment may reconstruct the unknown area by using one of an image inpainting method, an interpolation method based on neighboring information, and a method of filling sequentially the most similar patches found in a same scene. The image completion unit 150 according to another exemplary embodiment may reconstruct the unknown area by using a generative adversarial network (GAN) which is used for an image painting method that reconstructs the unknown area from a large number of test images based on adversarial positions.

Referring to FIG. 7A, an image 710 may indicate a left reference viewpoint and an image 730 may indicate a right reference viewpoint based on an image 720 which is photographed at the center reference viewpoint. Images 721, 722, and 723 may respectively indicate images in which the image 720, which is the central reference viewpoint image, is segmented into three layers according to the depth information. According to FIG. 7A, it may be segmented into scene units by using the depth information, or may be segmented into object units as an example.

The image generator 140 may perform image inpainting process filling the occluded area by using the depth information of each reference viewpoint described in FIG. 5 for the images 721 and 722, which have an area occluded by the foreground among images segmented into layers. The image completion unit 150 may perform an image completion process for the unknown area left after the image is generated. The unknown area is reconstructed as in the image 744 and the image 745 through the image completion process. Since the reconstructed target areas in the images 724 and 725 belong to the background area occluded by the foreground, the reference viewpoint image used for the reconstruction may be an image in which the foreground is excluded and the background is included. The image completion unit 150 may reconstruct the unknown area by using a trained network specialized for an image in which only the background is included. Using the trained network may improve the accuracy of the reconstruction.

FIG. 7B shows a plurality of images in which the unknown area and the occluded area are reconstructed by the image generator 140 and the image completion unit 150 are sequentially arranged based on the depth of the user's center and the gaze direction of the user. The scene change according to the movement of the user may be processed by the parallax generator 160.

The parallax generator 160 may provide a parallax to the images in which the plurality of images are sequentially arranged based on the depth of the gaze direction of the user, where each of the plurality of images may include the hidden area and the unknown area which are reconstructed by the image generator 140 and the image completion unit 150.

When the central axis of the user moves in a specific direction, the image corresponding to the foreground for each layer moves in the opposite direction to the specific direction of the user. The user may experience the motion parallax on the scene when the moving width of the moving multiple foreground images varies according to the distance from the user.

Referring to FIG. 8, an image 810, an image 820, and an image 830 are camera viewpoint images obtained at different viewpoints, and an images 840, an image 850, and an image 860 are images processed by the image completion process to which a parallax is added. The image 850 is the center reference viewpoint image, which is the same as the image 820, and the image 840 is an image when the central axis of the user moves to the left in the image 850. Referring to FIG. 8, objects 811 and 841, and objects 831 and 861 may have different viewpoint. Since a side part of the object of interest may be revealed as the user's viewpoint moves in the real natural environment, the user may recognize the 3D effect of the object. It is assumed that the object 850 corresponding to the foreground is shifted left and right as shown in the images 840 and 860, and only the position of the object 850 is changed. If a shifting gap of the central axis of the user is small, visual perception of the 3D shape is insignificant, but if the shifting gap of the central axis is relatively large, the cardboard effect that the paper without a 3D effect moves left and right may occur. Because of this, the user would feel unnatural.

In order to solve this problem, the parallax generator 160 may determine the image generated when the central axis moves in one of up and down, left and right, and forward and backward directions within the image in which the plurality of images reconstructed by the image generator 140 and the image completion unit 150 are sequentially arranged based on the depth of the gaze direction the user, and may perform the image warping for the determined image.

Specifically, the parallax generator 160 may separate the foreground area and the background area. Since the occluded area and the unknown area in the background area is filled by the image generator 140 and the image completion unit 150, the parallax generator 160 may perform the image warping process by using the depth information of the depth image generated by the depth estimator 122. The parallax generator 160 may perform the image warping process in an order from a foreground area farthest from the user to the closest foreground area after performing the image warping for the background area. When the foreground image is warped, a new face of the object may be inpainted by using adjacent reference viewpoints. Through this, a natural parallax can be generated.

As another exemplary embodiment, the parallax generator 160 may separate the reference viewpoint image into a visible area and an invisible area (i.e., the occluded area). Here, the visible area refers to an area of a basic image visible to the user in the reference viewpoint images, and the occluded area refers to a new area displayed when the viewpoint is moved. The occluded area may contain information of an area that is occluded by objects in the base image and cannot be seen by the user. In FIG. 5, the image 510 and the image 530 may indicate a new, occluded area according to the moving of the user, and the invisible area may include information related to the occluded area. The occluded area separated by the parallax generator 160 does not include any information, but information may be filled in the area occlude by the image generator 140 and the image completion unit 150. Thereafter, the parallax generator 160 may perform the image warping process by using the depth information of the depth image generated by the depth estimator 122. As described above, the parallax generator 160 may perform the image warping process from the invisible area corresponding to the farthest area to the basic area corresponding to the closest area to the user. A novel view may appear by the image warping process, and the novel view showed up by the image warping may be filled based on an adjacent reference viewpoint or surrounding pixels. As described above, if the reference viewpoint image is not separated into a plurality of layers, but is separated into the visible area and the invisible area, the amount of information related to the scene may be reduced by the number of reduced layers, thereby providing the motion parallax quickly and naturally.

Images 870, 880, and 890 may represent images in which depth of the object of interest separated from each reference viewpoint is excluded.

The parallax generator 160 may allocate a depth value for the object of interest as a pseudo depth value to adjust the 3D effect of the object of interest. For example, when the user moves the central axis of the user while gazing the object 881 at the central reference viewpoint, the parallax generator 160 may process depth adjustment process such as histogram equalization or histogram stretching for depth histogram of the object 881. Through this process, it is possible to form a more emphasized 3D experience on the object of interest while giving different warping aspects related to the object.

Figure 9:
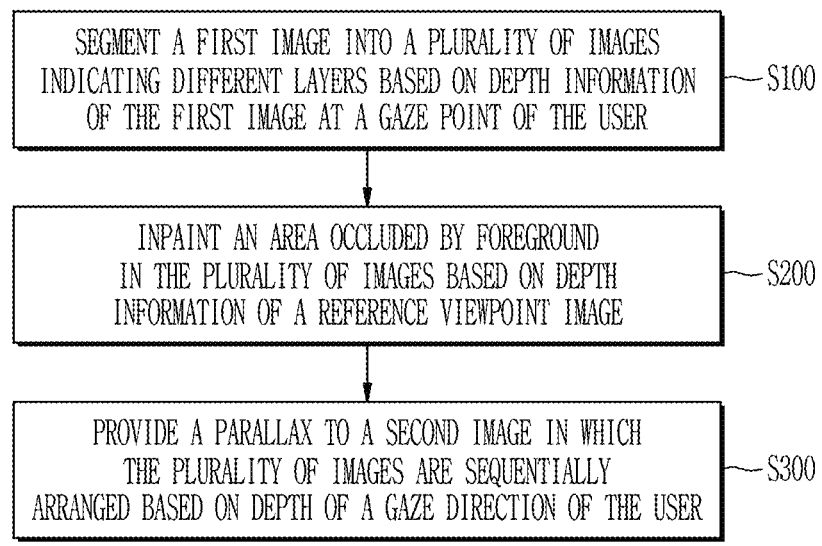
FIG. 9 and FIG. 10 are flowcharts illustrating a method for generating a 3D virtual viewpoint image according to an exemplary embodiment.
Figure 10:
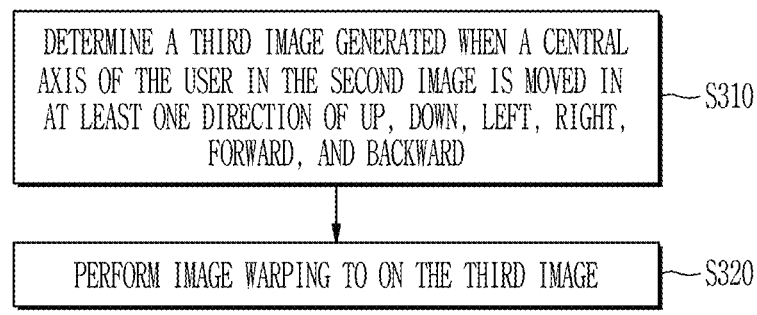

In the above, although the exemplary embodiments in FIGS. 3 to 8 have been described using the 2D array image as an example based on FIG. 1 illustrating a block diagram of the virtual viewpoint image generating apparatus 100, the present description can be extended to a 3D space. 3D pixels on the 3D space are called voxels. The background and the objects described in the present description may be modeled on the 3D space, and may be expressed in units such as a point cloud or a polygonal mesh. In the case of the 3D image, as described above, an area occluded by the foreground may occur according to the movement of the viewpoint of the user. To this end, according to an exemplary embodiment, the virtual viewpoint image generating apparatus 100 may separate the 3D space into a plurality of layers according to the depth or the viewpoint, and may provide a 3D motion parallax by reconstructing, in advance, new areas included in each separated layer (that is, a voxel of 3D space without information due to newly appearing) based on the reference viewpoint image and the depth information. FIG. 9 and FIG. 10 are flowcharts of a method for generating a virtual viewpoint image according to an exemplary embodiment.

Referring to FIG. 9 and FIG. 10, a method for generating a virtual viewpoint image according to an exemplary embodiment comprises: segmenting a first image into a plurality of images indicating different layers based on depth information of the first image at a gaze point of the user (S100); and reconstructing an area occluded by the foreground in the plurality of images based on depth information of a reference viewpoint image (S200).

After the reconstructing step S200, the method may include providing a parallax to a second image in which the plurality of images are sequentially arranged based on the depth of the gaze direction of the user (S300).

Step S300 of providing the parallax to the second image may include determining a third image generated when a central axis of the user in the second image is moved in at least one direction of up, down, left, right, forward, and backward (S310); and performing image warping on the third image (S320).

In S320 of performing the image warping, the background area and the foreground area may be separated from the third image, and the image warping may be performed on the background area and the foreground area.

In S320 of performing the image warping, the image warping may be performed in the order from a farthest foreground area to a closest foreground area from the user.

Step S100 of segmenting the first image into the plurality of images, step S200 of reconstructing the occluded area based on the depth information of the reference viewpoint image, and step S300 of providing the parallax to the second image described in FIG. 9 are the same as operations of the image information generator 120, the image generator 140, and the parallax generator 160 depicted in FIG. 1, therefore, detailed description is omitted here.

Since each layer image can be generated in advance, it is possible to reduce the implementation complexity in a terminal of the user.

In addition, in an immersive display such as a head mounted display (HMD), the foreground and the background may be separated around an area that the user gaze to increase the 3D experience for the object of interest.

Figure 11:
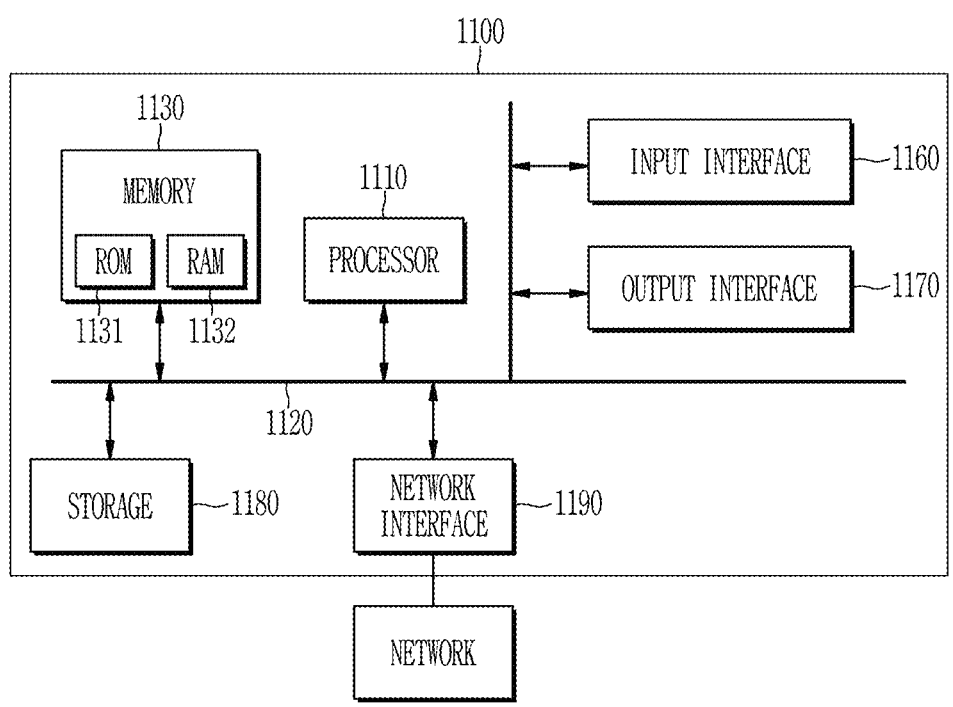
FIG. 11 is a block diagram illustrating an apparatus for generating a 3D virtual view image according to an exemplary embodiment.

FIG. 11 is a block diagram illustrating an apparatus for generating a 3D virtual view image according to an exemplary embodiment.

Referring to FIG. 11, an apparatus for generating a virtual viewpoint image according to an exemplary embodiment may be implemented as a computer system, for example, a computer-readable medium. A computer system 1100 may include at least one of processor 1110, a memory 1130, an input interface unit 1160, an output interface unit 1170, and storage 1180. The computer system 1100 may also include a network interface 1190 coupled to a network. The processor 1110 may be a central processing unit (CPU) or a semiconductor device that executes instructions stored in the memory 1130 or storage 1180. The memory 1130 and the storage 1180 may include various forms of volatile or non-volatile storage media. For example, the memory may include read only memory (ROM) 1131 or random access memory (RAM) 1132. In the exemplary embodiment of the present disclosure, the memory may be located inside or outside the processor, and the memory may be coupled to the processor through various means already known. Thus, the embodiments may be embodied as a computer-implemented method or as a non-volatile computer-readable medium having computer-executable instructions stored thereon. In one embodiment, when executed by the processor, computer readable instructions may perform the method according to at least one aspect of the present disclosure.

The apparatus for generating a virtual view image according to an embodiment includes a processor 1110 and a memory 1130, and the processor 1110 executes a program stored in the memory 1130 to perform: segmenting a first image into a plurality of images representing different layers based on depth information of the first image at a gaze point of a user; and reconstructing an area occluded by foreground in the plurality of images based on depth information of a reference viewpoint image.

After the reconstructing an area occluded by foreground in the plurality of images based on depth information of a reference viewpoint image, the processor 1110 may further perform providing a parallax to a second image in which the plurality of images are sequentially arranged based on depth of a gaze direction of the user.

When the processor 1110 performs the providing a parallax to a second image in which the plurality of images are sequentially arranged based on depth of a gaze direction of the user, the processor may perform: determining a third image generated when a central axis of the user in the second image is moved in at least one direction of up, down, left, right, forward, and backward; and performing image warping on the third image.

When the processor performs performing image warping on the third image, the processor may perform: separating a background area and a foreground area from the third image; and performing the image warping on the background area and the foreground area.

When the processor performs performing the image warping on the background area and the foreground area, the processor may perform performing the image warping in an order from the farthest foreground area from the user to the closest foreground area among the foreground areas.

The operations of the processor 1110 are the same as operations of the image information generator 120, the image generator 140, and the parallax generator 160 of FIG. 1, therefore, detailed description is omitted here.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (08) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

While this disclosure has been described in connection with what is presently considered to be practical example embodiments, it is to be understood that this disclosure is not limited to the disclosed embodiments, but, on the contrary, is intended to cover various modifications and equivalent arrangements included within the spirit and scope of the appended claims.

What is claimed is:

1. A method for generating a three-dimension (3D) virtual viewpoint image, the method comprising:
   segmenting a first image into a plurality of images indicating different layers based on depth information of the first image at a gaze point of a user;
   inpainting an area occluded by foreground in the plurality of images based on depth information of a reference viewpoint image;
   providing a parallax to a second image in which the plurality of images are sequentially arranged based on depth of a gaze direction of the user by determining a third image generated when a central axis of the user in the second image is moved in at least one direction of up, down, left, right, forward, and backward; and
   performing image warping on the third image by separating a background area and a foreground area from the third image, and performing the image warping on the background area and the foreground area.

2. The method of claim 1, wherein:
   the performing image warping on the background area and the foreground area comprises performing the image warping in an order from the farthest foreground area to the closest foreground area among the foreground areas.

3. An apparatus for generating a three-dimension (3D) virtual viewpoint image, the apparatus comprising:
an image information generator configured to segment a first image into a plurality of images indicating different layers based on depth information of the first image at a gaze point of a user;
an image generator configured to inpaint an area occluded by foreground in the plurality of images based on depth information of a reference viewpoint image; and
a parallax generator configured to
provide a parallax to a second image in which the plurality of images are sequentially arranged based on depth of a gaze direction of the user,
determine a third image generated when a central axis of the user in the second image is moved in at least one direction of up, down, left, right, forward, and backward,
perform image warping on the third image,
separate a background area and a foreground area from the third image, and
perform image warping on the background area and the foreground area.

4. The apparatus of claim 3, wherein when the parallax generator performs the image warping on the background area and the foreground area, the parallax generator further configured to
perform the image warping in an order from the farthest foreground area from the user to the closest foreground area among the foreground areas.

5. An apparatus for generating a three-dimensional (3D) virtual viewpoint image, the apparatus comprising:
a processor and a memory, wherein the processor executes a program stored in the memory to perform:
segmenting a first image into a plurality of images representing different layers based on depth information of the first image at a gaze point of a user;
reconstructing an area occluded by foreground in the plurality of images based on depth information of a reference viewpoint image;
providing a parallax to a second image in which the plurality of images are sequentially arranged based on depth of a gaze direction of the user;
determining a third image generated when a central axis of the user in the second image is moved in at least one direction of up, down, left, right, forward, and backward; and
performing image warping on the third image by separating a background area and a foreground area from the third image, and performing the image warping on the background area and the foreground area.

6. The apparatus of claim 5,
wherein when the processor performs performing the image warping on the background area and the foreground area, the processor performs
performing the image warping in an order from the farthest foreground area from the user to the closest foreground area among the foreground areas.

* * * * *